(12) United States Patent
Simontacchi et al.

(10) Patent No.: US 10,490,785 B1
(45) Date of Patent: Nov. 26, 2019

(54) CONTAINMENT, STORAGE AND SHIPPING OF LITHIUM BATTERIES

(71) Applicant: Firefree Coatings, Inc., San Rafael, CA (US)

(72) Inventors: John Simontacchi, San Rafael, CA (US); Bruno Tapolsky, Tiburon, CA (US)

(73) Assignee: Firefree Coatings, Inc., San Rafael, CA (US)

( * ) Notice: Subject to any disclaimer, the term of this patent is extended or adjusted under 35 U.S.C. 154(b) by 0 days.

(21) Appl. No.: 16/041,653

(22) Filed: Jul. 20, 2018

(51) Int. Cl.
*H01M 2/10* (2006.01)
*B60L 58/10* (2019.01)
*H01M 10/0525* (2010.01)

(52) U.S. Cl.
CPC ........... *H01M 2/1005* (2013.01); *B60L 58/10* (2019.02); *H01M 2/1094* (2013.01); *H01M 10/0525* (2013.01)

(58) Field of Classification Search
None
See application file for complete search history.

(56) References Cited

U.S. PATENT DOCUMENTS

| 2008/0078768 A1* | 4/2008 | Apostoluk | B32B 7/02 220/560.01 |
| 2011/0064997 A1* | 3/2011 | Peskar | H01M 2/1022 429/185 |
| 2016/0336627 A1* | 11/2016 | Syed | H01M 10/6551 |
| 2017/0179554 A1* | 6/2017 | Pingree | H01M 10/6555 |

* cited by examiner

*Primary Examiner* — Basia A Ridley
*Assistant Examiner* — Christopher P Domone
(74) *Attorney, Agent, or Firm* — Thomas M. Freiburger

(57) ABSTRACT

Rechargeable lithium batteries can store a high amount of energy per unit of volume. The batteries, common in electric vehicles, can become heated and exhibit thermal runaway, affecting adjacent batteries and causing fires. Containment of lithium batteries to prevent the spread of fire is effected by a battery box or container coated with a heat-activated intumescent material. This can be in the form of a coating on one or more walls of the battery containment apparatus on a vehicle or in a shipping container; for storage and shipment of batteries the containment can be via an inner box enveloped by an outer box, with the heat-activated intumescent material filling the space between the boxes.

11 Claims, 2 Drawing Sheets

CONTAINMENT, STORAGE AND SHIPPING OF LITHIUM BATTERIES

BACKGROUND OF THE INVENTION

This invention is concerned with lithium battery cells, and the problem of battery malfunctions, overheating and thermal runaway of the batteries. In particular, the invention is concerned with containment of overheating within battery cells to contain the thermal runaway and fire from spreading.

Lithium ion batteries are in widespread use in consumer electronics with a progression into electric vehicles in both the US and overseas markets. In addition, usage of the ion batteries are currently being tested in contained power storage silos as backup power systems for residential and commercial structures, and as power storage for solar and wind-generated power.

With the increase in the size of battery packs including battery storage and use comes a high level of fire hazards associated with the lithium ion batteries both in storage and in use, as witnessed by recent events.

Over the last 4 years, the applicant has received inquiries as to any possible solution to help protect products from a lithium battery fire. The requests included protecting hover boards from burning due to fire resulting from a lithium battery fire. This has been regarding automotive use as well as solar energy storage.

Packages of lithium batteries are often shipped in cardboard boxes. The batteries often overheat and fail, which can be triggered by puncturing, violent movements, or heat outside the container, and can cause fire, ignite other packages during shipment and can lead to disaster.

There has been a need for a reliable way to ship and store lithium batteries, as well as to protect electric vehicles and power storage towers from uncontrolled damage due to lithium battery failures and fires.

SUMMARY OF THE INVENTION

In arriving at the current invention, we realized that a workable approach to solving these problems would be to compartmentalize lithium battery cells, with isolated compartments holding relatively small numbers of the cells, with the goal of containing lithium battery fire to its point of origin. Even if the material containing the batteries is a cardboard or wood shipping box, these materials coated with a heat-activated intumescent material such as FIREFREE 88 (produced by Firefree Coatings, Inc. of San Rafael, Calif.) could contain a lithium battery fire against spreading outside the container. This also applies to the containment of lithium battery cells in electric vehicles, and electrical storage areas in transit vehicles such as trains and buses, and other applications. The container material might be fiberglass, aluminum, other metals, composites, plastics, gypsum board and even wood and cardboard.

In some cases this battery compartmentation might require, use of a small container within a larger container, the lithium battery cells being within the smaller container. The intumescent material is then applied in the space between the two containers, and even against additional surfaces, such as the inside surfaces of the smaller container. In other cases, and under some circumstances, a single container, coated with intumescent material, will be sufficient.

We tested these concepts for fire containment of lithium batteries. The first steps were to develop and pass comprehensive test criteria for fire containment of the batteries. Using the concept of shipping and storage of the batteries as a starting point, we determined the best course of action was to start with the most combustible material that would be used in the shipping and storage of lithium batteries, cardboard. We had no previous results on cardboard as we had with wood, thin gauge metal, aluminum, carbon fiber, and fiberglass composites, all of which could possibly be used for the storage or containment, in some fashion, of lithium batteries, whether in shipping containers, power storage towers, vehicle battery storage areas, transit trains and buses, aviation, maritime and other electronic devices in which lithium batteries are used.

It should be noted, based on the extensive level of testing performed on a wide range of materials, FIREFREE 88 has an established coating performance rate of 1.4 minutes per dry mil applied. This high level of performance is critical in being able to contain the highly challenging battery fires. This data is most pertinent in helping to establish coating thicknesses that would be applied to individual materials being used to house lithium batteries.

We started the process by coating a set of small boxes (8"×8"×4") from which we outlined a rough test using ingredients I had used in previous tests (demonstration burns for different sites, room corner test e.g.). The fire ignition source included excelsior, alcohol, and a fabric wick to create an ignition source. Lithium batteries were added to the first test in order to properly evaluate and see how lithium batteries actually perform in a fire.

We constructed the test samples, placing the batteries within the box including all of the ignition materials with an ignition wick material extending to the outside of the box sealing the cardboard boxes with masking tape. We conducted the first set of test burns at our (Firefree Coatings, Inc.) warehouse. From the test burns, we learned the fire characteristics of a lithium battery fire and how to proceed on additional testing.

The next step was to conduct testing at a viable fire testing facility. We contacted an IAS/ICC certified fire testing laboratory, Western Fire Center of Kelso, Wash., to schedule performing the next round of testing. This round of testing consisted of using smaller boxes fully loaded with batteries as that would replicate a real world condition type situation. Since there are no established fire test standards for lithium batteries, based on what we had done and learned on the first set of in house fire tests, we developed a test procedure from which we could run a fire test with thermocoupling set within the box. The thermocoupling was important in order that temperatures could be recorded inside the box over the time period of the test.

We wrote up the test procedure that we would use in conducting the test, including a post observation time, as batteries are known to have delayed ignition issues. A battery igniting devise, placed in the box amongst the batteries, was used as an ignition source.

For the first test at WFC, we coated a series of small (single walled) cardboard boxes at different coating thicknesses in order to evaluate the fire performance of the FF88 coating at different coating thicknesses with the same battery fuel load. The boxes were filled with batteries and the thermocouples installed within the box. The test boxes were closed and sealed shut with standard, off the shelf masking tape. As a result of the test, we had a failure from the tape used to seal the boxes. The tape broke down early in the test from temperature failure, allowing the top to open and fire to spread upwards from the box.

As a result of the first test, we contacted 3M to get information on tapes that would perform and hold up to high temperatures. From our conversation with 3M, we were able to get samples of a high heat performing tape which was to be used and tested in the next round of fire testing.

In the next round of testing at WFC, in which the 3M tape was used, the testing was successful with the tape holding up and performing well in the fire test. Note that the 3M tape that was used for boxes was very useful for carboard boxes, but would probably not be needed for other lithium battery situations.

In regard to the testing, the concept was to start out with small scale testing and migrate to a large scale test with two smaller boxes inside a larger box with a number of the second larger boxes being placed inside a single large box. Since this would require stacking of boxes inside boxes, based on our extensive fire testing knowledge, we coated cardboard separator or spacer panels (using the FF88 coating) placed between layers of boxes.

As an alternative to (or supplementing) coating the cardboard boxes, we coated cardboard inserts, cut to size, that could be placed within cardboard boxes to provide a more cost effective solution over directly coating the individual boxes. The reasoning for this was due to the amount of labor it was requiring to coat the insides of the made up boxes and trying to achieve a consistent coating thickness.

For the large scale test, we made a drawing of the test assembly make up, along with designating boxes to be coated and boxes to get inserts along with a thermocouple placement chart. We wrote up the test procedure along with drawings and supplied the information to Western Fire Center. A battery igniting device, placed in the box amongst the batteries, was used as an ignition source.

The idea for using thermocouples placed at different locations within the boxes and at the exterior of the boxes was to measure the flame and temperature effects created from the burning lithium batteries. In regard to the thermocouple data, we set a low temperature failure threshold of a temperature not to exceed 400° F. at the interior side of the boxes, to insure a safe level of performance in containing a lithium battery fire to its original container. A two-hour, post burn observation period was used to monitor any possible battery re-ignition.

The test results proved the coating had the ability to contain a lithium battery fire to the point of origin using one of the most combustible materials in which lithium batteries might be stored (cardboard).

The results of the testing:

1. Established a viable test standard to be used for any kind of lithium battery testing for any situation as stated above regarding the areas where lithium batteries could be used.

2. Established a flexible coating system, particularly with the use of the FIREFREE 88 coating, based on our extensive testing on many different material substrates, that can be used in many different areas for application to contain lithium battery fires.

The invention can be carried out in a number of different types of container structures. In one form the intumescent coating can be applied to one surface of a containment area, i.e. on one panel which is adjacent to a series of lithium batteries, such as on a panel on an electric car or truck, or in a panel of a box of a power storage facility. The containment can be in one direction that is critical for fire spread or high heat exposure. It could also be in several directions, with several walls coated. In another form, the invention can be applied to a storage or shipping container for lithium battery cells, which might be metal, plastic or fiber material, or wood or cardboard. Cardboard (i.e. corrugated paper board; referred to herein as cardboard) is typically used for shipping containers, and with the invention it can be made to contain the thermal runaway and fire that might occur with one or more battery cells within the box. Preferably all interior surfaces of the box (typically six surfaces) are coated, preferably with FIREFREE 88 material produced by Firefree Coatings, Inc. as noted above. The cardboard walls can be single-wall cardboard, usually about 3/32 inch to 1/8 inch in thickness. Double-wall cardboard could be used in the box if desired. Such a box might contain a large number of lithium battery cells, such as 150 to 200 cells.

For additional security in particular situations, the box described above can be an inner box, surrounded by an outer box of the same material or of other material. A space can be left between the two boxes, e.g. 1/4 inch to 1/2 inch space all around, which spacing can be maintained by separating devices or spacers. In practice FIREFREE 88 material seems to perform well even where virtually no space is provided between surfaces, or between batteries and a container surface. In addition to the intumescent coating on the inside of the inner box, there can be a coating applied on the outside of the inner box, or on the inside of the outer box. In this way, in the event of an overheating or fire situation within the inner box, double layers of containment are provided: expanded intumescent material in the inner box, directly around the batteries, and expanded intumescent material outside the inner box, in the event high heat reaches the outside of the inner box. Another benefit is that fire or high heat from outside the outer box will be prevented from reaching the contained batteries by the intumescent material that is inside the outer box.

If the boxes containing lithium batteries are stacked, a separation panel can be placed between the boxes for additional protection. This could be, for example, a honeycomb structure of cardboard, aluminum or plastic, and it can be coated with the heat-activated intumescent material. Further, such a separation panel can be positioned below the lower box, or below a single box that rests on a floor. Rather than a honeycomb structure as a separation panel, any web of material such as cardboard can be formed into a spacer web with strips of the cardboard extending at right angles to one another and overlapped to form the separation panel.

In another aspect of the invention, fiberglass mesh (such as used to repair damage in FRP surfaces) can be impregnated with FIREFREE 88 material, as by dipping, then removing excess. The impregnated fiberglass mesh can be shaped into any desired configuration and can be installed against a surface of a container or compartment holding lithium batteries, or it can simply be inserted into a package adjacent to the batteries.

In service the heat-activated intumescent material when subjected to fire or high heat deprives the space of oxygen, cools and insulates the contained batteries, and substantially prevents smoke.

It is among the objects of the invention to reliably prevent lithium battery runaways and fires from spreading, via a convenient system utilizing heat-activated intumescent material, such as FIREFREE 88, on a containment surface near the batteries. These and other objects, advantages and features of the invention will be apparent from the following description of a preferred embodiment, considered along with the accompanying drawings.

DESCRIPTION OF PREFERRED EMBODIMENTS

Figure 1:
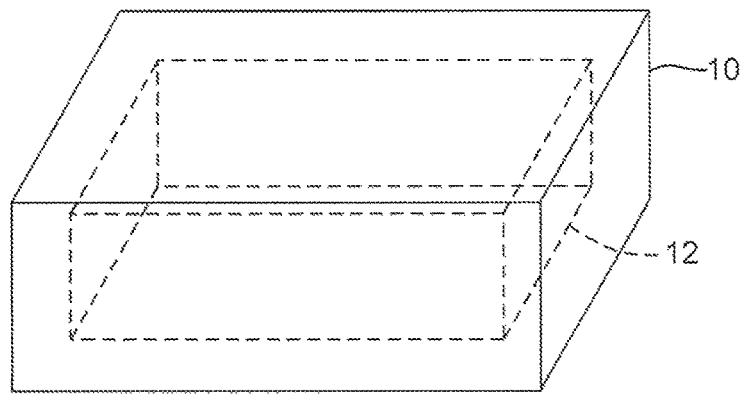
FIG. 1 is a perspective view showing a containment arrangement for lithium batteries according to the invention.
Figure 2:
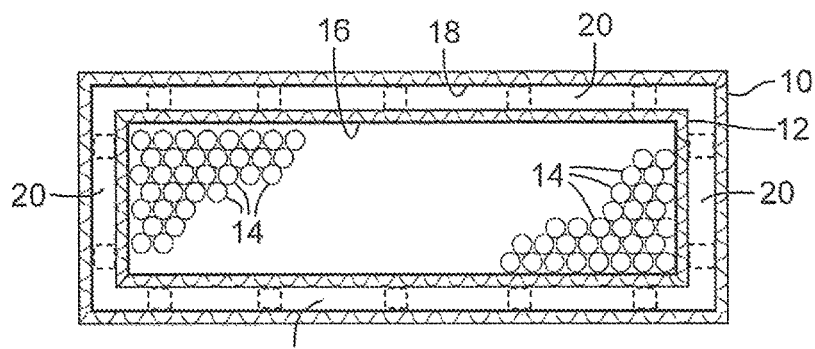
FIG. 2 is a sectional view showing a containment arrangement such as in FIG. 1.

In the drawings, FIGS. 1 and 2 schematically show a container 10, which may be a shipping container, formed of a typical material for shipping, such as cardboard. The container could also be metal, FRP (fiberglass reinforced plastic), composite, plastic, wood or other materials as noted above. In this arrangement a smaller, inner box 12 is contained within the larger, outer box 10. FIG. 2 shows, very schematically, that a series, or a multiplicity, of battery cells 14 are contained within the inner container 12. These batteries 14 may be contained together within the box by any appropriate means, or they can be packed very closely within the inner box or container 12.

Within the inner container 12 a heat-activated intumescent material has been applied in a coating 16 against the interior surfaces of the container. The intumescent material, preferably FIREFREE 88 material, can be painted or sprayed onto the surfaces. In addition, the intumescent material preferably is applied as a coating 18 on the interior surfaces of the outer box or container 10. Alternatively, as noted above, a coating of the intumescent material could be applied onto the outside surfaces of the inner box 12. In either event, double protection against the spread of a battery fire is provided by the intumescent material. It will expand within the inner box 12, against the battery cells 14 under high heat conditions such as a thermal runaway in some or all the batteries. This alone is usually sufficient to contain the battery fire. However, the outer container 10, also coated with FIREFREE 88 material, provides dual layers of protection. Note that there is preferably a small space 20 between two containers, and to maintain this spacing separators or spacers can be placed between the two containers. The spacers could take any form, such as cardboard strips on edge, which can be formed into a web, or pieces of any material that will occupy the distance between the two containers with minimal absorption of space. As noted above, it is been found through testing that if two cardboard surfaces are against one another, one of them coated with FIREFREE 88, the material will contain heat and fire even if it does not have the space to fully intumesce.

Figure 3:
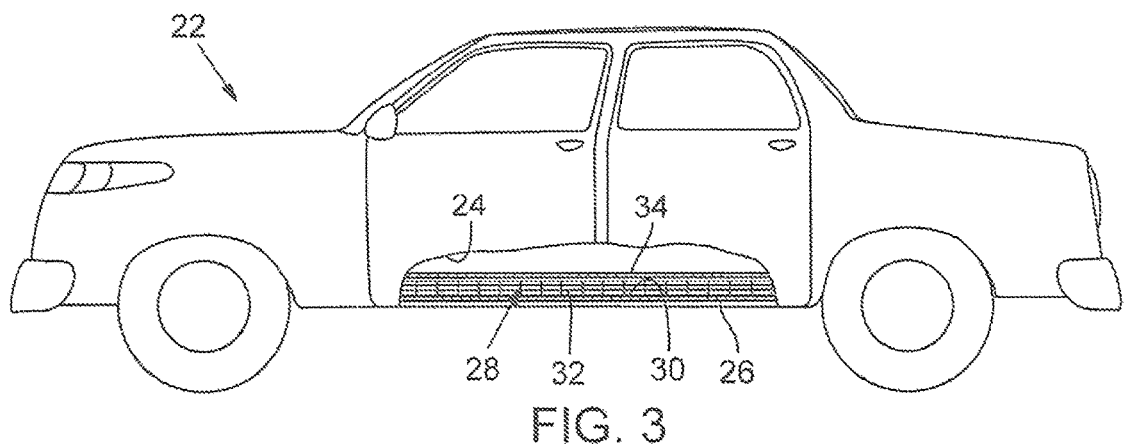
FIG. 3 is a schematic view showing an electric car having lithium battery cells retained at the bottom side of a car and with battery fire protection according to the invention.

In FIG. 3 is an electric vehicle, e.g. an electric car 22, shown with a portion 24 in the side of the car cut away. The electric car has a platform 26 at the bottom of the vehicle, forming part of a large battery casing or container 28 in which are located a multiplicity of lithium battery cells, e.g. thousands of the cells.

This bottom location for the many battery cells, with considerable weight, has been used in contemporary electric cars, one advantage being the establishment of a low center of gravity for the vehicle. However, accidents have occurred in which many of the battery cells have overheated and caused serious fires, sometimes from accidents in which the battery compartment is pierced and battery cells are penetrated.

A coating of heat-activated intumescent material is shown at 30, against an upper surface of the platform 26 or on another surface just above, the coating 30 being adjacent to, but preferably not touching, the battery cells 32. In this illustration only the surface just below the batteries is coated, but the upper wall 34 of the compartment could also be coated on its inner side, and front, rear and side walls of the compartment 28 could also be coated. The intumescent material, preferably FIREFREE 88, will greatly reduce the risk of thermal runaway throughout the compartment 28, to at least partially contain a fire, avoiding disaster.

Figure 4:
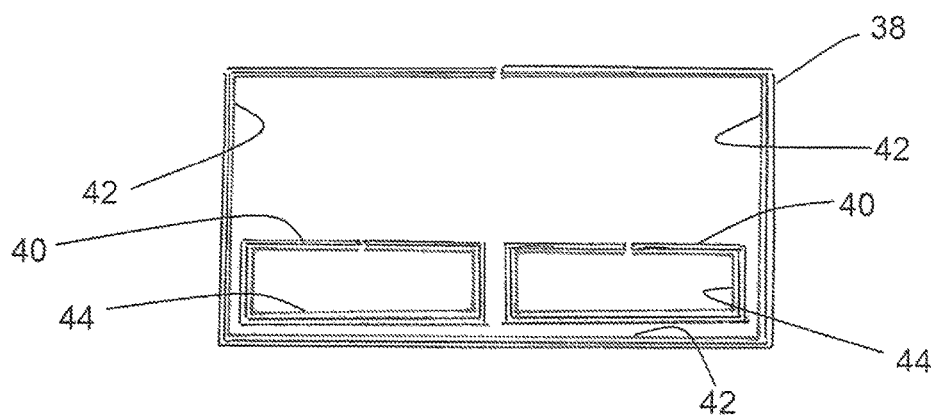
FIG. 4 is a sectional elevation view showing smaller boxes positioned within a larger container, and with protection according to the invention applied to surfaces to contain battery fires.

FIG. 4 shows schematically an example of a large box container 38, in this case containing a plurality of smaller, inner boxes 40 that hold lithium batteries. Here, FIREFREE 88 material is coated directly on interior surfaces of all boxes. This is indicated at 42 in the larger box, and 44 in the inner, smaller box. Additional boxes can be included within the larger box 38. Some space is shown around the inner boxes, and the space can be retained by spacers (not shown) if desired, to allow the FIREFREE 88 material to fully expand. However, as noted above, considerable protection is afforded even if the inner boxes are contacting the FIREFREE 88 material directly.

Figure 5:
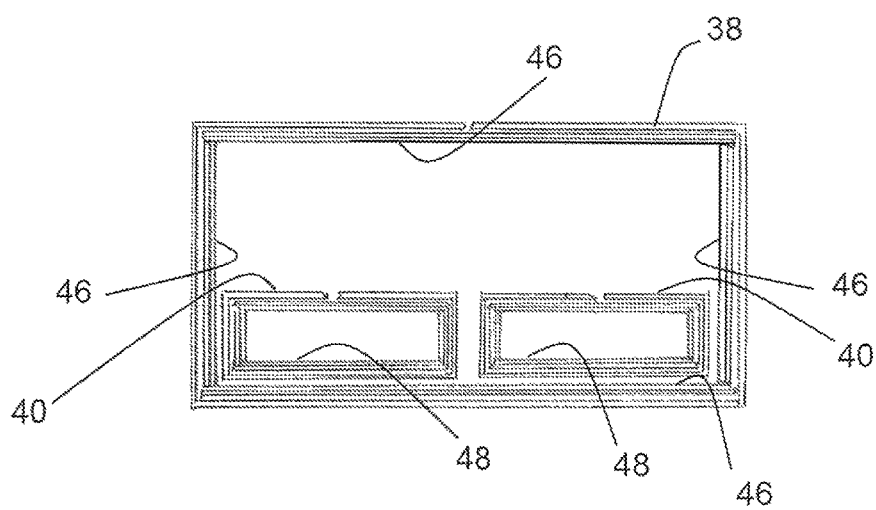
FIG. 5 is a view similar to FIG. 4, but with a variation.

FIG. 5 shows a variation in which the intumescent material is not directly applied to the boxes. Here, inserts 46 are positioned with the outer box 38, preferably against the interior walls, and inserts 48 are positioned against the interior walls of the smaller, inner boxes 40 that contain lithium batteries. These inserts comprise a substrate precoated with FIREFREE 88 material, prior to insertion into the boxes. This can be done for convenience in some circumstances wherein it is more efficient to insert coated substrate pieces, e.g. cardboard, into boxes than to apply the intumescent material directly. The insert substrate could be materials other than cardboard if desired, and they can be very thin, not typical corrugated paper cardboard, since they are only relied on for carrying the coating.

The invention can be implemented in several different forms, the principal feature being that lithium batteries, in the event of thermal runaway and fire, are contained or partially contained by a layer of heat-activated intumescent material, preferably FIREFREE 88, on one or more surfaces adjacent to the location of the batteries.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A battery container holding a plurality of lithium battery cells, comprising:
    the battery container including a plurality of walls that together surround the plurality of the lithium battery cells,
    on at least one wall of the plurality of walls, a liquid-applied coating of a heat-activated intumescent material on a surface of the wall to provide a fire barrier against progression of fire and heat outside the battery container, and
    the coating of heat-activated intumescent material being at least 10 mils thick when dry on said one of the walls and being expandable to at least 25 times thickness when heated to at least 275° F.

2. The battery container of claim 1, wherein the heat-activated intumescent material is applied to all walls at the interior of the battery container.

3. The battery container of claim 2, wherein the battery container comprises an outer container, and including an inner container enveloped within the outer container, with the plurality of lithium battery cells enclosed within the inner container, and the intumescent material being sufficient to at least partially fill a space between the outer container and the inner container when heated to a fire temperature and expanded in thickness.

4. The battery container of claim 3, wherein the space between the outer container and the inner container includes spacers to retain the space between the containers.

5. The battery container of claim 4, wherein the spacers are coated with the intumescent material.

6. The battery container of claim 1, wherein the heat-activated intumescent material is at least 20 mils thick when dry on the wall and is expandable to at least 25 times thickness when heated to at least 275° F., to a thickness of at least one-half inch.

7. The battery container of claim 1, wherein the container is a battery compartment in an electric motor vehicle.

8. A battery container holding a plurality of lithium battery cells, comprising:

the battery container including a plurality of walls that together surround a plurality of the lithium battery cells, adjacent to at least one of the walls, a sheet of substrate in the container, the substrate having a surface coated with a heat-activated, liquid-applied coating of intumescent material to provide a fire barrier against progression of fire and heat from outside the battery container, and the coating of heat-activated intumescent material being at least 10 mils thick when dry on said surface and being expandable to at least 25 times thickness when heated to at least 275° F.

9. The battery container of claim 8, wherein the sheet of substrate is cardboard.

10. The battery container of claim 8, wherein the sheet of substrate comprises a fiberglass mesh.

11. The battery container of claim 8, wherein a plurality of coated sheets of substrate material are adjacent to a plurality of the walls.

* * * * *